United States Patent [19]

Henricksen

[11] Patent Number: 5,167,392
[45] Date of Patent: Dec. 1, 1992

[54] COLLAPSIBLE BEVERAGE CONTAINER RECEPTACLE WITH PIVOTALLY ADJUSTABLE ARMS

[75] Inventor: Douglas A. Henricksen, Boca Raton, Fla.

[73] Assignee: Enginuity Inc., Boca Raton, Fla.

[21] Appl. No.: 634,004

[22] Filed: Dec. 26, 1990

[51] Int. Cl.$^5$ ................................................. A47K 1/09
[52] U.S. Cl. ............................... 248/311.2; 248/316.5; 403/92; 403/96
[58] Field of Search ....................... 248/311.2, 313, 318, 248/316.5; 403/92, 93, 96; 224/273

[56] References Cited

U.S. PATENT DOCUMENTS

| | | |
|---|---|---|
| 1,954,269 | 4/1934 | Slowig . |
| 2,502,641 | 4/1950 | Consor ............................... 403/93 X |
| 3,233,858 | 2/1966 | Benjamin . |
| 3,749,088 | 7/1973 | Kohlmann ........................ 403/96 X |
| 4,511,072 | 4/1985 | Owens . |
| 4,629,153 | 12/1986 | Marcum . |
| 4,767,092 | 8/1988 | Weatherly . |
| 4,813,582 | 3/1989 | Henricksen et al. . |
| 4,828,211 | 5/1989 | McConnell et al. ............. 248/311.2 |
| 4,881,843 | 11/1989 | Randleman ............................ 403/92 |
| 4,887,784 | 12/1989 | Kayali ............................... 248/311.2 |
| 4,943,111 | 7/1990 | VanderLaan . |
| 4,981,277 | 1/1991 | Elwell ............................... 248/311.2 |
| 4,984,722 | 1/1991 | Moore ........................... 248/311.2 X |

Primary Examiner—David L. Talbott
Attorney, Agent, or Firm—Martin John McKinley

[57] ABSTRACT

The opening (233) between two adjustable arms (204-205) can be varied to accommodate a wide variety of beverage container sizes. A swivel bar (203) is pivotally attached to a supporting structure (202) by inserting hinge pins (210) into hinge pin holes (212). A pair of arms, each of which includes a retaining pin (214), are pivotally attached to the swivel bar by inserting the retaining pins into holes (218) at opposite ends of the swivel bar. The retaining pins have a narrow stem (214a) and a wider head (214b), the head being wider than the holes. During assembly, the head compresses as it is being inserted into the hole, and expands after it has been forced through the hole, thereby permanently attaching the arm. A detent wheel (213), contilever spring (215) and pawl (216) hold the arms in one of three predetermined angular positions. Each arm, detent wheel and retaining pin are integrally formed as a unitary structure from a single plastic injection mold. Similarly, the swivel bar, spring and pawl are integrally formed from one mold. Alternately, the arm may include an insert (603) that can be positioned in one of three insert holes (504a-504c) in the swivel bar. To adjust an arm, the swivel bar/arm assembly must be tilted to a 45 degree "adjustment" position, and then the arm is lifted so that the insert can be repositioned in a different hole.

16 Claims, 8 Drawing Sheets

COLLAPSIBLE BEVERAGE CONTAINER RECEPTACLE WITH PIVOTALLY ADJUSTABLE ARMS

BACKGROUND OF THE INVENTION

This invention pertains to receptacles for beverage containers and, more particularly, to a receptacle that is adjustable for receiving various sizes of beverage containers and that may be attached to a vehicle, such as an automobile.

FIG. 1 is an illustration of a typical prior art, collapsible, vehicular attachable, beverage container receptacle. Referring to this figure, the prior art receptacle 100 includes a base 101, a frame 102 and an arm assembly 103. The base 101 includes two hinge pin holes 104 (only one hole is visible in FIG. 1) for receiving hinge pins 105. Hinge pins 105 are attached to brackets 106 that project out perpendicularly from the frame 102. Each hinge pin hole 104 is surrounded by a raised portion or boss 107. To facilitate attachment of the base 101 to the frame 102, the ends of the hinge pins 105 include a beveled surface 105a, and the bosses 107 include a beveled recess 107a.

The arm assembly 103 includes two hinge pins 108 (only one hinge pin is visible in FIG. 1) and the frame 102 includes mating hinge pin holes 109, which are located in brackets 110 that project out perpendicularly from the frame. To facilitate attachment of the arm assembly 103 to the frame 102, the inner surfaces 110a of the brackets 110 (only one inner surface is visible in FIG. 1) are beveled, and the ends of the hinge pins 108 include a beveled surface 108a.

The frame 102 also includes four cantilever springs, an upper pair 111 and a lower pair 112. The upper pair of cantilever springs 111 holds the arm assembly 103 in the "open" position (the position in which the arm assembly is perpendicular to the frame 102) by placing moderate pressure on the rear surface 103a of the arm assembly. Similarly, the lower pair of springs 112 holds the base 101 in the open position (perpendicular to the frame) by placing moderate pressure on the rear surface 113a of the side 113 of the base.

The receptacle can be "closed" into a compact storage position by, first, folding the arm assembly 103 down against the frame 102. Then, the base 101 is folded up, also against the frame 102, such that the arm assembly is positioned within the four side walls 113-116 of the base. The upper pair of cantilever springs 111 holds the arm assembly 103 in the closed position by placing moderate pressure on the lower edge 103b of the arm assembly. Similarly, the lower pair of cantilever springs 112 holds the base 101 in the closed position by placing moderate pressure on the upper edge 113b of the side 113. The maximum bending of the cantilever springs 111 and 112 occurs when the base 101 and arm assembly 103 are being moved between the open and closed positions. In particular, the springs exert maximum pressure (greater than "moderate") when the base 101 and the arm assembly 103 are approximately midway between the open and closed positions.

The frame 102 includes six holes, e.g., 117, (only five are visible in FIG. 1) are provided for mounting the prior art receptacle through the use of screws or other fasteners. In operation, a beverage container is inserted through the throat opening 118 in the arm assembly 103 and the bottom of the container rests on the base 101. Because the throat opening 118 is fixed in the prior art receptacle 100, there is a limitation as to the size of beverage containers that can be inserted into the receptacle. Although the opening 118 can always be increased to accommodate larger sizes of beverage containers, the throat opening eventually becomes too large to securely hold the smaller size beverage containers.

In U.S. Pat. No. 4,828,211 to McConnell, a foldable, adjustable beverage container support is disclosed in which a pair of opposing arms slide from side to side to accommodate various sizes of containers. Each of the arms is positioned within an elongated slot formed in a "track element" such that the movement of the arms is limited by the length of the slots. Each half of the track element includes two opposing legs separated by an elongated slot, and each of the adjustable arms includes opposing, parallel upper and lower channels. The arms are attached to the track element by momentarily spreading the legs and inserting the arm into the slot between the legs such that the legs are positioned in the upper and lower channels. The track element is pivotally attached to a back panel by inserting pintels on the track element into mating holes in ears that extend out from the back panel. Two spring elements are attached to the back panel by a pair of connectors, such as rivets. Each spring element includes a detent which engages one of a plurality of vertical notches in the back of the corresponding arm. When engaged in a particular notch, the spring element holds the arm in its current position. As the arms are moved from side to side, the detent in the spring element engages a different vertical notch in the arm, thereby providing a plurality of predetermined arm positions.

Although the size of the opening between the arms is variable, the primary disadvantage of the McConnell support is that the basic shape of the opening between the arms never changes (it merely gets wider or narrower, depending on the position of the arms). In contrast, the present invention uses pivotal arms and the basic shape of the opening between the pivotal arms changes with arm position. This fundamental change in the shape of the opening permits the present invention to accept a wider range of beverage container sizes than the slidable arms of McConnell.

In U.S. Pat. No. 4,511,072 to Owens, two embodiments of an adjustable holder for a drinking cup are disclosed. In the first embodiment, two opposing arms rotate in the vertical plane towards or away from a drinking cup. The lower end of each of the arms includes a wheel that is rotatably attached to a tray. A coil spring, which is positioned within a recess in the tray, forces a ball into one of several notches in the circumference of the wheel. The spring and ball combination holds the arm in one of several predetermined positions. To change the position, the user rotates the arm from one position to another, thereby causing the ball to move from one notch to another. In addition to its complexity, this embodiment of the cup holder is not easily adapted for attachment to the door of an automobile.

In the second embodiment of Owens, a tray is hingedly attached to a bracket. When in use, the tray is horizontal and the bracket vertical. A slidable hangar member is connected to the bracket for attaching the holder to an automobile window structure. Retainer arms are hingedly connected to the bracket and are movable between open and closed modes. In the open mode, the retainer arms are normal to the bracket and, in the closed mode, the arms lay against the bracket.

The arms engage a drinking cup, and the bottom of the cup rests on the tray. The retainer arms may be hinged, such that they can be rotated to accommodate different sizes of drinking cups. The primary disadvantage of this particular embodiment is that no mechanism is provided to hold the arms in position.

The present invention overcomes many of the disadvantages of the prior art designs. In addition, the present invention can be entirely manufactured using inexpensive injection molded plastics. Depending on the complexity of the shape of a part to be injection molded, molds can be either "single-action" or "multi-action." In a single-action mold, the two halves of the body of the mold are joined together, hot plastic is injected into the mold under pressure, the molded part hardens, the mold is separated into its two component parts, and the part is removed. As the complexity of the shape of the molded part increases, however, single-action molding is no longer possible, and the manufacturer must resort to a more complex molding process.

In the more complex multi-action molding process, the body of the mold also includes steel inserts, which are inserted into the cavity of the mold after the two halves of the body of the mold are joined together. After the hot plastic is injected into the mold cavity and the molded part hardens, the inserts must be withdrawn before the two halves of the body of the mold body are separated. This increased complexity of the multi-action mold not only increases the manufacturing cost of the mold and decreases its life expectancy, but also increases the manufacturing time of each molded part, thereby increasing the cost of each part. Accordingly, it is a particular object of the present invention to provide an adjustable beverage container receptacle in which the component parts can be plastic injection molded using either single-action molds, or multi-action molds having a minimum number of movable inserts and in which the travel and complexity of the inserts is minimal.

SUMMARY OF THE INVENTION

Briefly, the invention is an adjustable beverage container receptacle that includes a supporting structure, a swivel bar and means for attaching the swivel bar to the supporting structure. The means for pivotally attaching the swivel bar to the supporting structure may include a pair of hinge pins on the swivel bar that are inserted into mating hinge pin holes in the supporting structure. An arm is pivotally attached to the swivel bar by another pivotal attaching means, such that the arm can rotate between first and second positions. When the arm is in the first position, a first angle is formed between the arm and the swivel bar. Similarly, a second angle is formed between the arm and the swivel bar when the arm is in the second position. Means are provided for holding the arm in a selectable one of the two positions.

The means for holding the arm may include first and second detents, a pawl and spring means for forcing the pawl into one of the detents. The detents may be formed in a detent wheel that is integrally formed with the arm as a unitary structure (i.e., the detent wheel and the arm are not separately manufactured and then later attached; instead, both are integrally manufactured, e.g., by plastic injection molding in a single mold). When the pawl is engaged in the first detent, the arm is held in the first position. Similarly, when the pawl is engaged in the second detent, the arm is held in the second position. A predetermined force is required to overcome the force of the spring means to move the arm from one position to the other. The spring means may include a cantilever spring, which may be integrally formed with the swivel bar as a unitary structure.

Alternately, the means for holding the arm may include an insert, and first and second holes for receiving the insert. When the insert is in the first hole, the arm is held in the first position. Similarly, the arm is held in the second position when the insert is in the second hole.

The means for pivotally attaching the arm to the swivel bar may include a retaining pin having a stem portion and a wider head portion, and a retaining pin hole for receiving the stem portion. The retaining pin hole may be located in the swivel bar. The stem and head portions are integrally formed as a unitary structure, and the retaining pin may also be integrally formed with the arm. The stem portion is positioned in the hole and the head portion is wider than the hole, such that the arm is attached to the swivel bar, but free to pivot about the retaining pin. When the means for holding the arm includes an insert and mating insert holes, the stem portion of the retaining pin may be longer than the depth of the retaining pin hole, such that the arm can be lifted a predetermined distance to withdraw the insert from its hole.

BRIEF DESCRIPTION OF THE DRAWINGS

In the drawings, "hidden lines" may occasionally be omitted to improve the clarity of the drawings.

DESCRIPTION OF THE PREFERRED EMBODIMENT

A description of the preferred embodiment of the beverage container receptacle appears below. This description is in two parts, the first part is a description of the construction of the invention, while the second part is a description of the operation of the invention.

Construction

Figure 1:
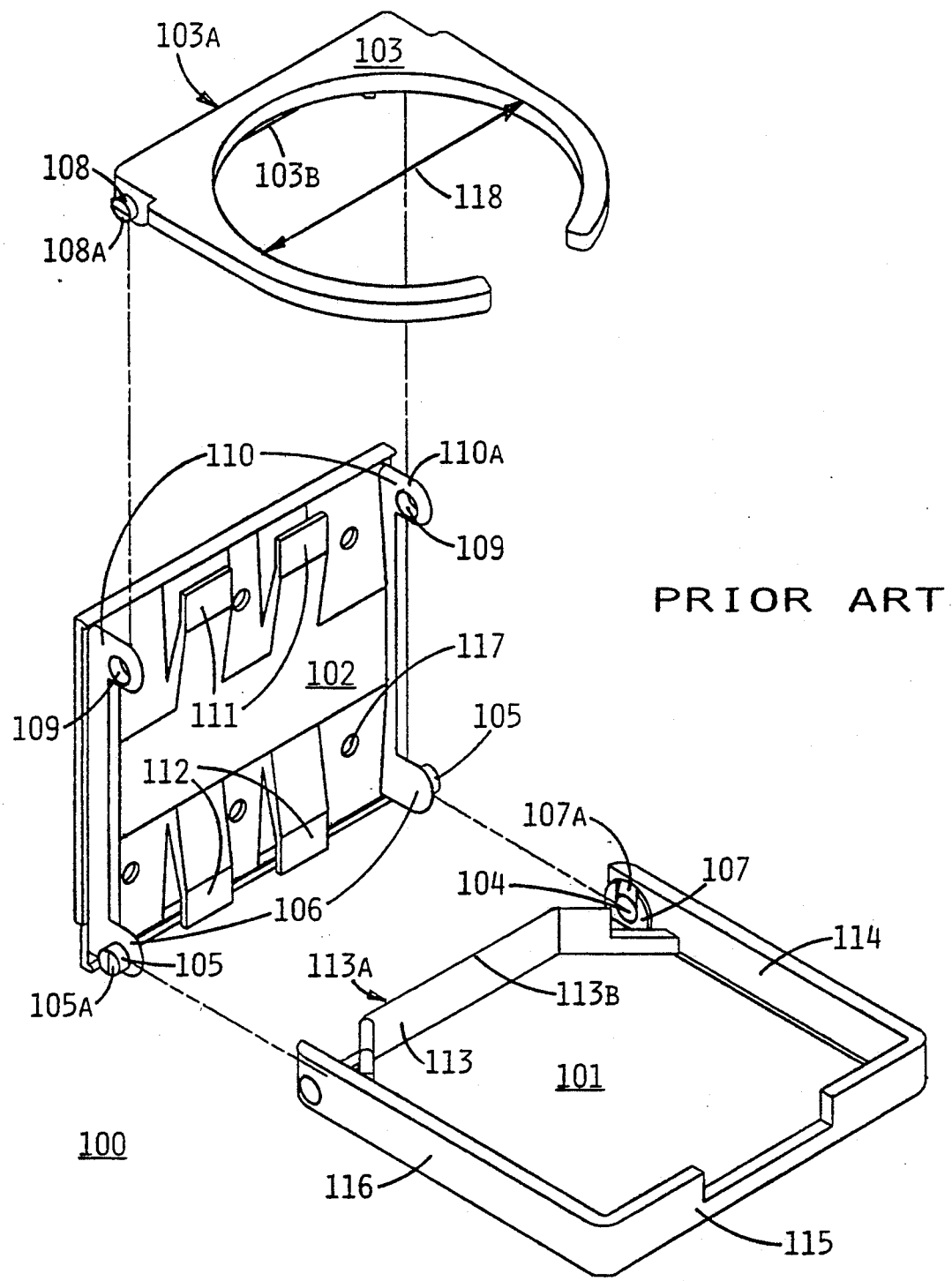
FIG. 1 is an exploded perspective view of a nonadjustable prior art beverage container receptacle.
Figure 2:
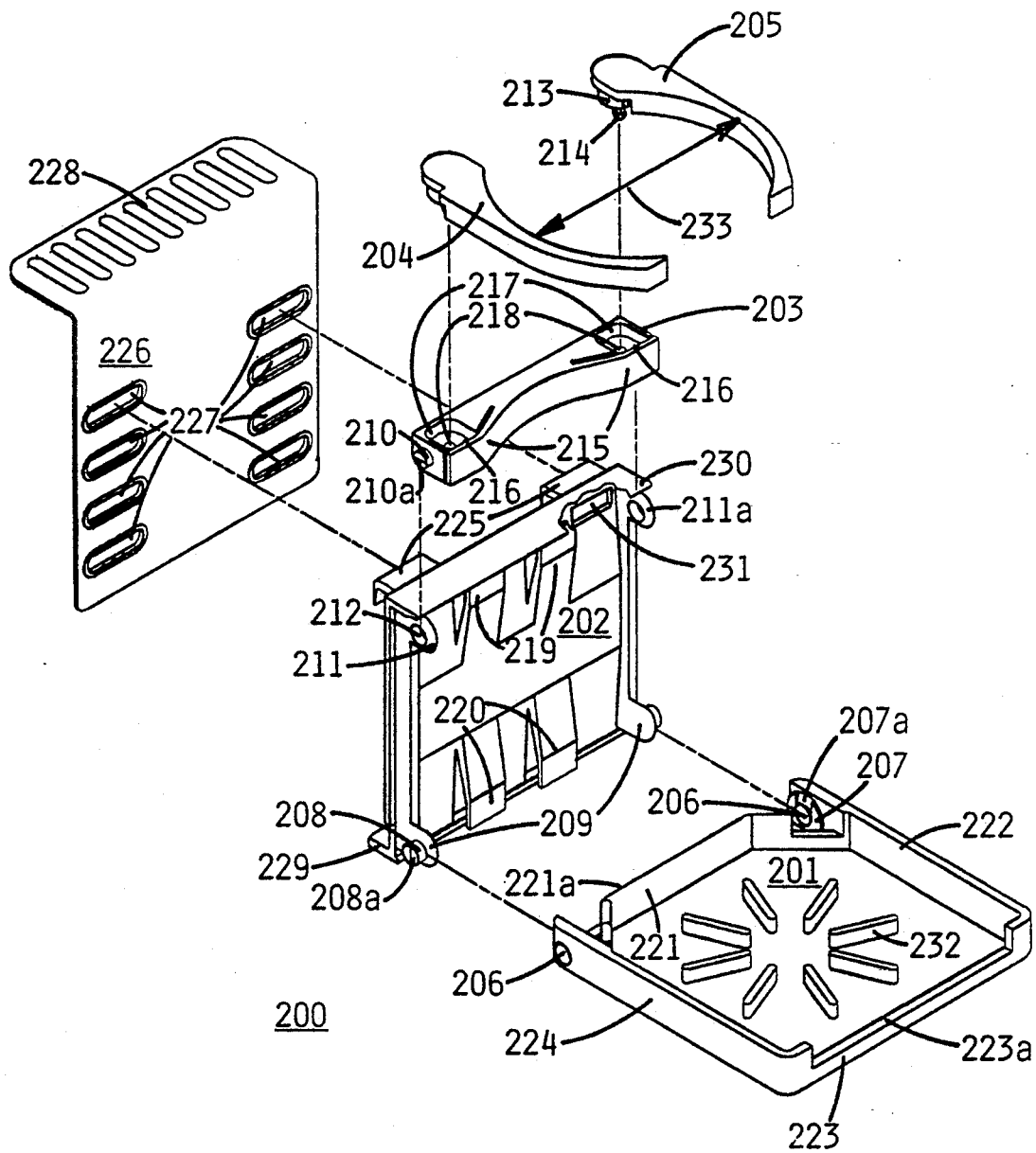
FIG. 2 is an exploded perspective view of the preferred embodiment of the present invention.
Figure 3:
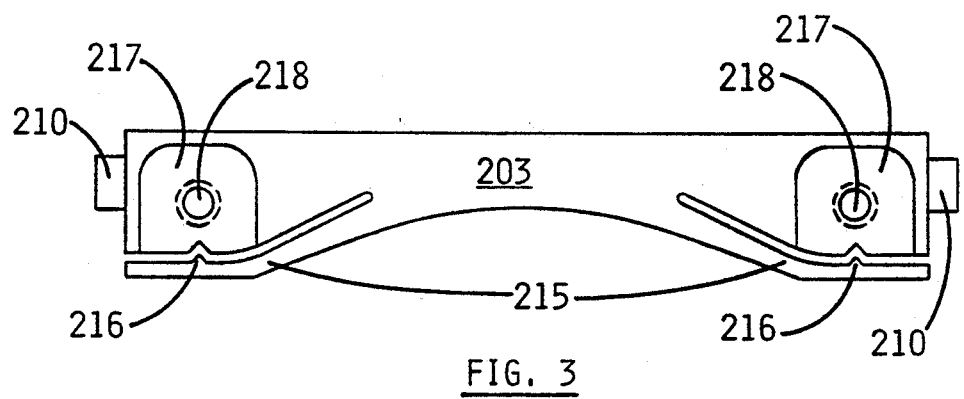
FIG. 3 is a top plan view of the preferred embodiment of the swivel bar.
Figure 4:
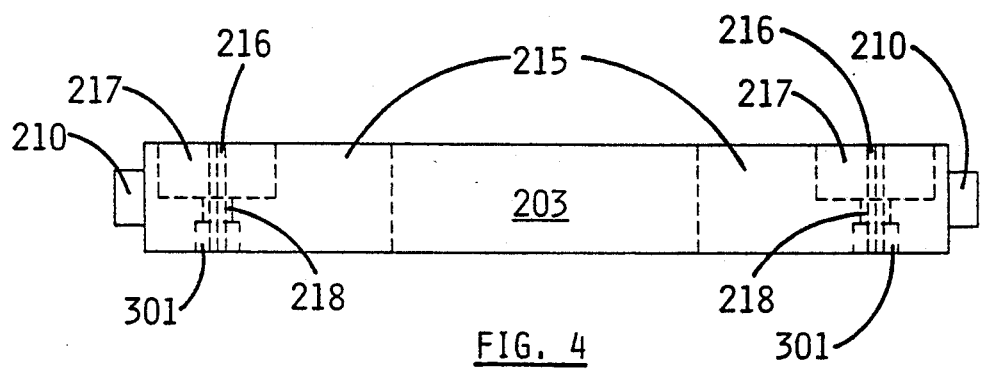
FIG. 4 is a front elevation view of the preferred embodiment of the swivel bar.

FIG. 2 is an exploded perspective view of the preferred embodiment of the invention. Referring to this figure, the receptacle 200 includes a base 201, a frame 202, a swivel bar 203, and left and right adjustable arms 204 and 205, respectively. The frame 202 provides a supporting structure for the base 201, swivel bar 203 and arms 204-205. The base includes two hinge pin holes 206, each of which is surrounded by a raised portion or boss 207. Hinge pins 208 are attached to brackets 209 that project out perpendicularly from the frame 202. To facilitate the attachement of the base 201 to the frame 202, each of the bosses 207 include a beveled recess 207a, and the ends of the hinge pins include a beveled surface 208a. To attach the base 201 to the frame 202, the frame is placed parallel to the base with the beveled surfaces 208a of the hinge pins inserted into the corresponding beveled recesses 207a of the bosses. Then, a force is applied to the base and the frame to force the hinge pins 208 into the holes 206.

The swivel bar 203 includes two hinge pins 210 (only one pin is visible in FIG. 2) which are attached to opposite ends of the bar. The end of each hinge pin 210 includes a beveled surface 210a. Frame 202 includes upper brackets 211, each of which includes a hinge pin hole 212. To facilitate the attachment of the swivel bar 203 to the frame 202, the inner surfaces 211a of the upper brackets are beveled (only one beveled inner surface is visible in FIG. 2). The swivel bar 203 is attached to the frame 202 in a manner similar to the way the base 201 is attached to the frame. Specifically, the swivel bar 203 is positioned adjacent the frame 202, such that the beveled surfaces 210a of the hinge pins are touching the beveled inner surfaces 211a of the upper brackets. Then, the hinge pins 210 of the swivel bar 203 are snapped into the hinge pin holes 212 of the upper brackets.

Figure 6:
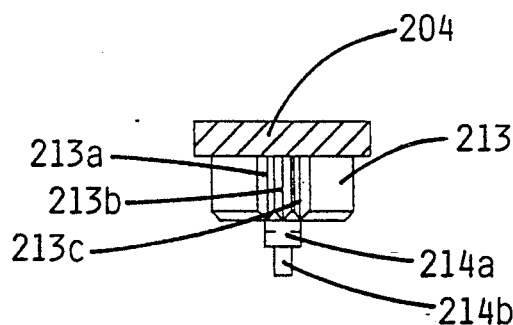
FIG. 6 is a cross sectional view of the preferred embodiment of the left arm as seen along line 6—6 of FIG. 7.
Figure 7:
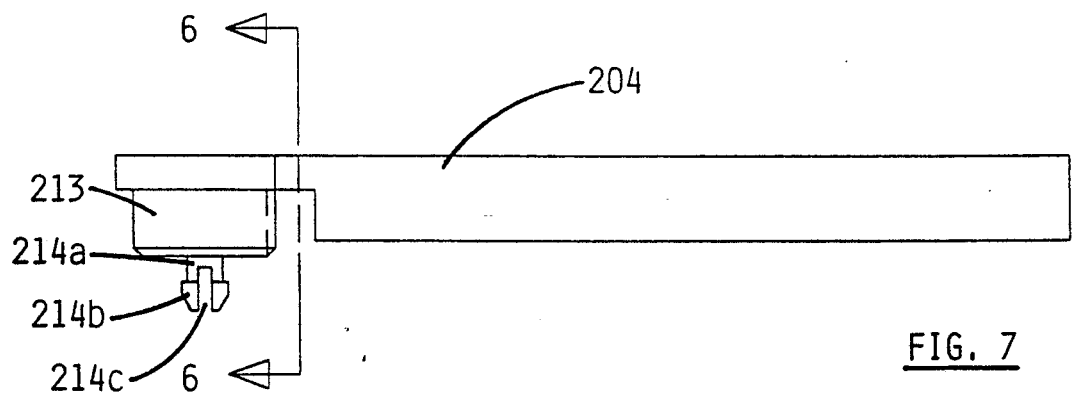
FIG. 7 is a left side elevation view of the preferred embodiment of the left arm, the right arm being the mirror image of the left.
Figure 8:
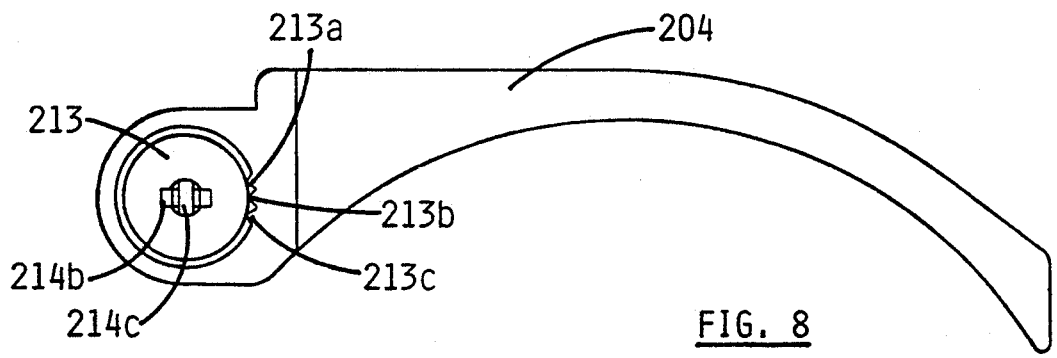
FIG. 8 is a bottom plan view of the preferred embodiment of the left arm.

Visible in FIG. 2 on right arm 205 is a detent wheel 213 and an arrowhead shaped retaining pin 214, both of which are shown in greater detail in FIGS. 6-8. Although not visible in FIG. 2, left arm 204 also includes a detent wheel and retaining pin. The swivel bar 203 includes left and right cantilever springs 215, each of which includes a pawl 216 for engaging one of the detents in the corresponding detent wheel 213. Two recesses 217 are provided in the swivel bar 203 for receiving the corresponding detent wheel 213 of the arms 204-205. Two cylindrical holes 218 for receiving the retaining pins 214 are located approximately in the center of each recess 217 and extend completely through the swivel bar 203. To attach the arms 204-205 to the swivel bar, the retaining pins are forced into the holes 218. Because the heads of the retaining pins 214 are wider than the diameter of the holes 218, the heads are compressed as they are inserted into the holes, and then expand after being forced all the way through the holes, thereby providing a "snap fit" attachment of the arms to the swivel bar.

Figure 5:
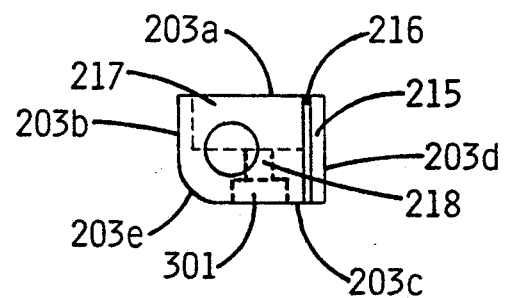
FIG. 5 is a left side elevation view of the preferred embodiment of the swivel bar.

The frame 202 includes an upper 219 and lower 220 pair of cantilever springs. The upper pair of springs 219 holds the swivel bar 203 in the "open" position (the position in which the arms 204 and 205 are perpendicular to the frame 202) by placing moderate pressure on the rear surface 203b (see FIG. 5) of the bar. Similarly, the lower pair of cantilever springs 220 holds the base 201 in the open position (similarly, the position in which the base 201 is perpendicular to the frame) by placing moderate pressure on the rear surface 221a of the side 221 of the base. The base 201 includes sides 221-224. Side 223 includes a recess 223a into which the user can insert a thumb or finger to facilitate the opening of the base.

The frame 202 also includes downwardly turned hooks 225 for insertion into a selected pair of holes 227 in a strap 226. The upper portion 228 of the strap is designed for insertion into the "window pocket" (the space between the window glass and the door or frame) of an automobile door, as is described in U.S. Pat. No. 4,903,872. Two tabs 229 (only one is visible in FIG. 2) are attached to the rear surface of the frame 202. The tabs 229 assist in the leveling of the receptacle 200, as described in the above referenced patent. An overhang 230, which is merely "decorative" when used with the swivel bar and arm assembly illustrated in FIGS. 3-8, extends over the swivel bar 203. Two holes 231 (only one hole is visible in FIG. 2) permit the manufacture of the hooks 225 without the need for movable inserts in the body of the mold. Specifically, two bar shaped projections (one for each hook) in the mold extend through the holes 231 to the inner surface of the downwardly turned portion of the hooks 225, thereby forming the space between the frame 202 and the hooks without the use of a movable insert.

As is well known, cold beverages cause "sweating" to occur on the exterior surfaces of certain types of beverage containers. This is the condensation of moisture from the atmosphere on the cold exterior surface of a beverage container. To reduce the effects of sweating, base 201 also includes standoffs, e.g., 232, to position the base of a cup or other beverage container above the upper surface of the base 201. As will be described in further detail below, the throat opening 233 between the arms 204 and 205 can be adjusted to adapt the receptacle to hold a variety of sizes of beverage containers.

Detailed illustrations of the swivel bar 203 appear in FIGS. 3-7. Referring to these figures, swivel bar 203 has four exterior, substantially perpendicular surfaces 203a-203d. A fifth exterior surface 203e joins surfaces 203b and 203c. The upper pair of cantilever springs 219 (see FIG. 2) holds the swivel bar/arm assembly in the "open" position (the position in which the arms 204-205 are perpendicular to the frame 202 and parallel to the open base 201) by placing moderate pressure on the rear exterior surface 203b of the swivel bar. Similarly, the upper pair of cantilever springs 219 holds the swivel bar/arm assembly 203-205 in the "closed" position (the position in which the arms 204-205 are folded down, against the frame 202) by placing moderate pressure on the lower exterior surface 203c of the swivel bar 203. Exterior surface 203e is curved to permit a smooth transition of the swivel bar/arm assembly between the open and closed positions. In between the open and closed positions, the upper pair of cantilever springs 219 places maximum pressure (greater than "moderate") on the curved exterior surface 203e of the swivel bar. In the alternative, curved exterior surface 203e can be eliminated and exterior surfaces 203b and 203c joined at a sharp right angle.

Swivel bar 203 also includes two cylindrical recesses 301, which are positioned below upper recesses 217 and coaxial with hole 218. Lower recesses 301 receive the expanded heads of the retaining pins 214 after the tabs are forced through the holes 218 in the swivel bar. The depth of the lower recesses 301 should be sufficient such that the heads of the retaining pins 214 do not extend beyond the lower exterior surface 203c of the swivel bar. Furthermore, the diameter of the lower recesses 301 must be sufficient to permit the head of the retaining pins 214 to freely rotate as the arms 204-205 (to which the retaining pins are attached) are rotated. Similarly, the "diameter" of the upper recesses 217 must be sufficient to permit the detent wheels 213 underneath the arms 204-205 to freely rotate within the upper recesses. Only the engagement of the pawls 216 in the detents of the wheels 213, in combination with the force of the cantilever springs 215, should inhibit the rotation of the arms 204-205. The diameter of the hole 218 should be sufficiently narrow such that the retaining pins 214 can not be removed from the holes 218 once the tabs have been fully inserted into the holes.

Swivel bar 203, including the hinge pins 210, cantilever springs 215 and pawls 216, in integrally formed as a unitary structure by, preferably, plastic injection molding. The phrase "integrally formed as a unitary structure" and similar phrases are used throughout this specification to indicate that a group of individual parts are manufactured as one single complex part, and that the individual parts are not separately manufactured and then later connected together. A complex part that was molded from a single mold would be an example of a part that was integrally formed as a unitary structure. It should be evident to those skilled in the art that swivel bar 203 has been designed such that it can be easily manufactured using only one single-action mold.

Detailed illustrations of the left arm 204 (the right arm is the mirror image of the left) appear in FIGS. 6-7. Referring to these figures, detent wheel 213 includes three detents 213a-213c. Retaining pins 214 include a narrow stem portion 214a and a wider head portion 214b. The diameter of the narrow head portion 214a is slightly narrower than the diameter of hole 218, while the width of the head portion 214b is wider than the diameter of the hole 218. Head portion 214b includes a slot 214c to permit the compression of the head portion when it is being inserted into the hole 218. Arms 204-205, including detent wheels 213 and retaining pins 214, are each integrally manufactured as a single unitary part by, preferably, plastic injection molding. It should be evident to those skilled in the art that, if not for the narrow stem portions 214a of the retaining pins, each of the arms could be entirely manufactured through the use of only a single action mold. Although a mold insert may be required to form the stem portions 214a, this insert is quite straight forward and its travel into the mold cavity is extremely short so as not to significantly impact the cost or longevity of the mold, or the cost of the molded part.

Besides the use of a compressible head 214b, other variations of the use of a retaining pin having a narrow stem portion and a wider head portion are possible. For example, the head portion may consist of a "key" that extends out in one direction from the bottom of the retaining pin. When this type of retaining pin is used, a slot or "keyhole" is placed adjacent to and opening into each hole 218. To assemble the arm to the swivel bar, the arm is rotated such that the key lines up with the keyhole, and the retaining pin is inserted all the way into the hole 218, such that the key extends beyond the bottom of the hole. Then, the swivel bar is rotated such that the key no longer lines up with the keyhole, thereby attaching the arm to the swivel bar.

Figure 9:
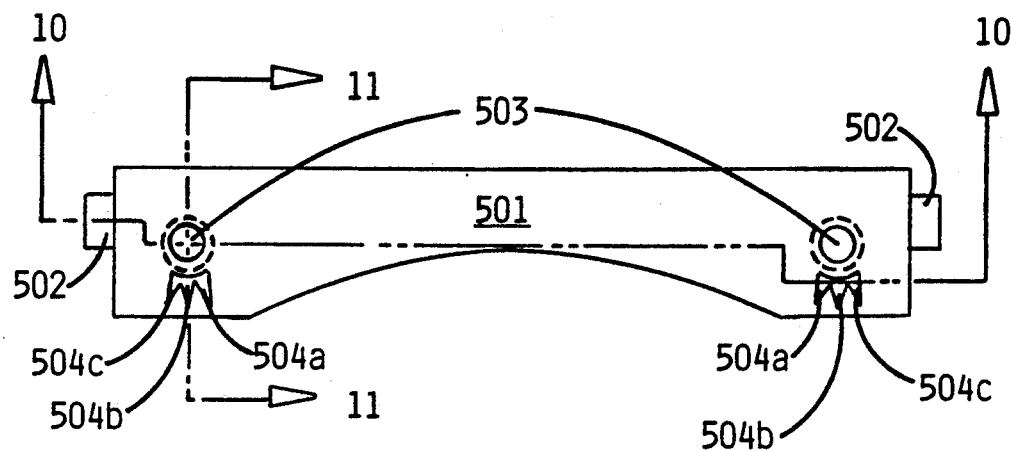
FIG. 9 is a top plan view of an alternate embodiment of the swivel bar.
Figure 10:
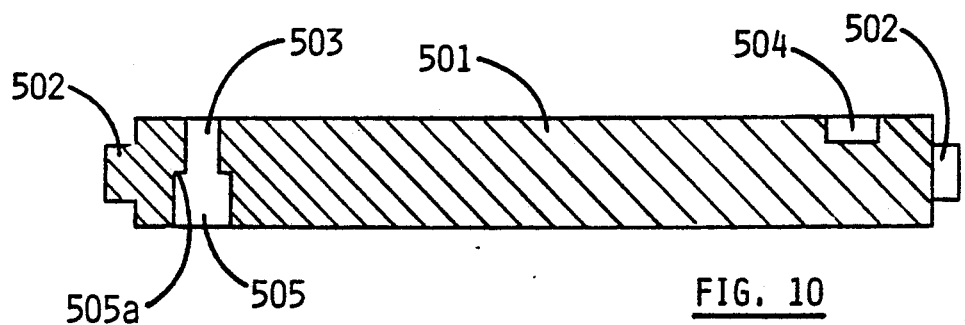
FIG. 10 is a cross sectional view of the alternate embodiment of the swivel bar as seen along line 10—10 of FIG. 9.
Figure 11:
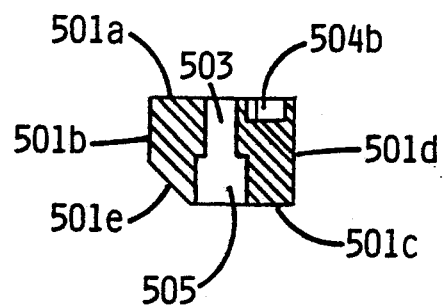
FIG. 11 is a cross sectional view of the alternate embodiment of the swivel bar as seen along line 11—11 of FIG. 9.

An alternate embodiment of the swivel bar/arm assembly is illustrated in FIGS. 9-14 and, in particular, the alternate embodiment of the swivel bar 501 is illustrated in FIGS. 9-11. Referring to FIGS. 9-11, the alternate embodiment of the swivel bar 501 includes four, substantially perpendicular exterior surfaces 501a-501d. A fifth exterior surface 501e is positioned between, and forms a 135 degree angle with surfaces 501b and 501c. When the beverage holder of the present invention includes the alternate swivel bar and arm assembly, the upper pair of cantilever springs 219 holds the swivel bar/arm assembly in the open position by placing moderate pressure on the rear exterior surface 501b of the swivel bar. Similarly, the upper pair of cantilever springs 219 holds the swivel bar/arm assembly in the closed position by placing moderate pressure on the lower exterior surface 501c. The open and closed positions for the alternate embodiment of the swivel bar/arm assembly are similar to the open and closed positions for the preferred embodiment of the assembly. In addition to the open and closed positions, the alternate embodiment of the swivel bar/arm assembly also has an "adjustment" position. In the adjustment position, the arms form a 45 degree angle with the frame 202, and the upper pair of cantilever springs 219 holds the assembly in this position by placing moderate pressure on the exterior surface 501e of the swivel bar.

The swivel bar 501 includes hinge pins 502, which are similar to hinge pins 210. A pair of holes 503, which are similar to holes 218, extend through the swivel bar 501 and receive the narrow stem portion of an arm retaining pin. Adjacent each hole 503, is a plurality of additional holes 504a-504c that extend below the upper exterior surface 501a of the swivel bar, but not necessarily completely through the swivel bar. Individual holes 504a-504c are connected, such that they form a single hole 504; however, the joining of the individual holes to form a single hole is not essential to the invention. Each of the individual holes 504a-504c is spaced at a slightly different angle, as measured from the axis of hole 503. The shape of holes 504a-504c is designed to receive an insert on the bottom of the arms. This insert is described in more detail in connection with FIGS. 12-14. Although three holes 504a-504c are preferred, any numbe of holes may be used.

Figure 12:
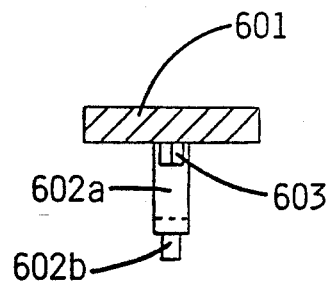
FIG. 12 is a cross sectional view of an alternate embodiment of the left arm as seen along line 12—12 of FIG. 13.
Figure 13:
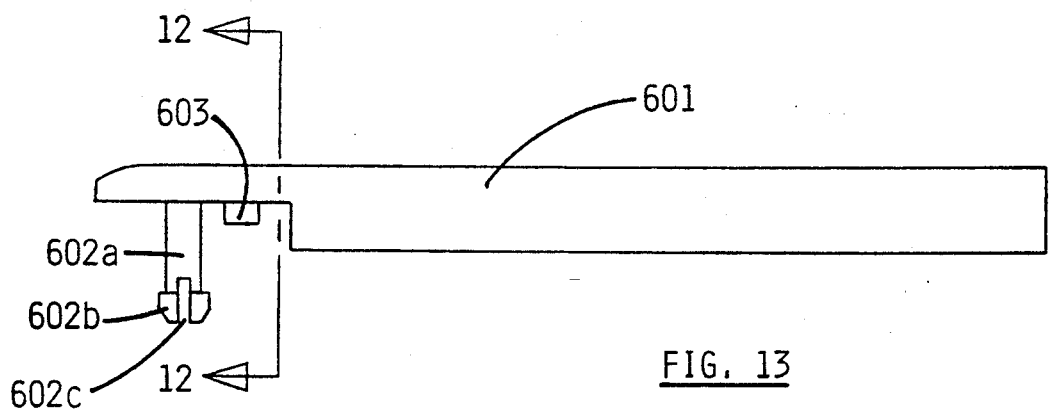
FIG. 13 is a left side elevation view of the alternate embodiment of the left arm, the right arm being the mirror image of the left.
Figure 14:
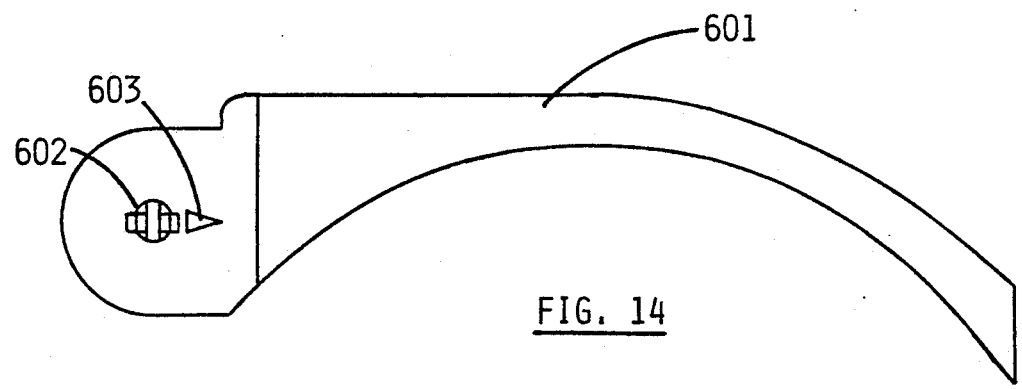
FIG. 14 is a bottom plan view of the alternate embodiment of the left arm.
Figure 16:
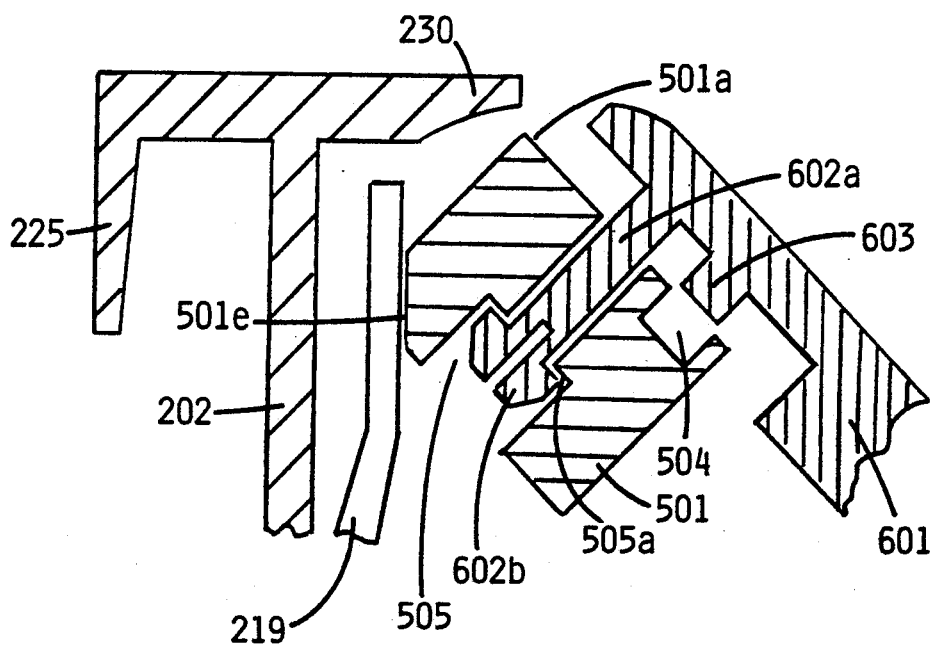
FIG. 16 is a cross sectional view of the present invention including the alternate embodiment of the arm and swivel bar assembly in which the arm and swivel bar have been rotated into the "adjustment" position in which the arm forms a 45 degree angle with the supporting frame, and the arm has been lifted to permit it to be rotated to vary the throat opening between the arms.

The alternate embodiment of the left arm is illustrated in FIGS. 12-14, the right arm being the mirror image of the left. Referring to these figures, the left arm 601 includes a retaining pin 602 that has a narrow stem portion 602a, a wider head portion 602b and a slot 602c. A triangular shaped insert 603 projects down from the lower surface of the arm. Although the preferred shape for the insert is triangular (in cross section) other shapes are also possible (provided, of course, that the mating holes 504a–504c in the swivel bar are appropriately shaped). Retaining pin 602 is similar to retaining pin 214, except that the length of the stem portion 602a (as measured from the bottom surface of the arm to the top of the head portion) is greater than the depth of the hole 503 in the swivel bar by at least the height of the insert 603. Since the stem portion 602a is longer than the depth of the hole 503, the arm 601 can be lifted above the swivel bar (in a direction parallel to the axis of the retaining pin, as depicted in FIG. 16) until the head portion of the retaining pin strikes the lip 505a of the swivel bar, such that the insert 603 clears the upper surface 501a of the swivel bar. When the arm 601 is lifted to this height, the arm can then be rotated to a new position and then lowered such that the insert 603 drops into a new hole 504a, 504b or 504c in the swivel bar. Consequently, the insert 603 and the corresponding holes 504a–504c provide another means for holding the arm in one of several selectable positions.

It should be noted that for every embodiment of the invention described in this specification, it is possible to devise additional embodiments in which the positions of the component parts of the arm holding means are reversed. For example, the detent wheel 213 of FIG. 2 can be formed as part of the swivel bar 203, and each of the cantilever springs 215 can be formed as part of an arm 204–205.

Numerous non-illustrated alternate embodiments of the invention will now be described. In one alternate embodiment of the insert 603 and insert hole 504 arrangement for holding the arms in selectable positions, the insert holes are formed in the frame 202 (or even in the cantilever springs 219) and the inserts are formed at rearward tip of the arms, such that the inserts project out over the rear edge of the swivel bar and into one of the insert holes in the frame. In a second alternate embodiment of the insert and insert hold arrangement, the insert holes are located in the overhang 230 and each of the inserts is formed on the upper surface of an arm, e.g., opposite the location where insert 603 is attached to the lower surface of arm 601. To change the position of the arms in either of these alternate embodiments of the insert and insert hold arrangement, the user simply tilts the swivel bar/arm assembly down until the inserts are withdrawn from the insert holes. Next, the user repositions the arms and then returns the swivel bar/arm assembly to the open position, such that the inserts are engaged in a new pair of insert holes.

Three alternate embodiments of the detent wheel arrangement will now be described. In each of these alternate embodiments, the cantilever springs 215 of the swivel bar are eliminated, and the cantilever springs 219 on the frame 202 are used, either directly or indirectly, to force the pawls into a detent. In a first alternate embodiment of the detent wheel arrangement, the pawls are located on the frame 202, and the detent wheels 213 are reversed 180 degrees, such that the detents 213a–213c face the frame. Each of the pawls has access to the detents either through an opening in the wall of the swivel bar surrounding the recess 213, or the detent wheels may be located above the swivel bar.

In a second alternate embodiment of the detent wheel arrangement, the pawls are located under the overhang 230, and the detent wheels are positioned on top of the arms. For this embodiment, the detents are located in the upper, flat, circular-shaped surface of the wheel, rather than in the circumferential surface of the wheel as depicted in FIG. 6. In each of the first and second alternate embodiments of the detent wheel arrangement, the cantilever springs 219 in the frame 202 indirectly force the pawls into the detents. Since the cantilever springs 219 tend to rotate the swivel bar/arm assembly into the open position (once the swivel bar/arm assembly has been tilted above the 45 degree position) and the pawls only engage the detents when the swivel bar/arm assembly is in the open position, it is the cantilever springs 219 that are responsible for holding the pawls in the detents. To increase this tendency of the cantilever springs 219 to drive the pawls into the detents, the smooth, round surface 203e on the lower, rear edge of the swivel bar 203 should be eliminated, and the rear 203b and lower 203c surfaces joined at a right angle.

In a third alternate embodiment of the detent wheel arrangement, the cantilever springs 219 are moved outwardly from the position illustrated in FIG. 2, such that the springs are adjacent the detent wheels, and the pawls are located directly on the cantilever springs of the frame 202. In this particular embodiment, the detent wheels are as described with reference to the first alternate embodiment of the detent wheel arrangement. In this third alternate embodiment of the detent wheel arrangement, the cantilever springs 219 directly force the pawls into the detents of the detent wheel.

It should be noted that there is no requirement that the detent wheels be round and, if round, that they form a full 360 degree circle. For example, in the third alternate embodiment of the detent wheel arrangement, if the pawl and detent wheel are reversed, such that the pawl is located on the arm and the detent wheels are located on the cantilever springs 219, the detent wheel would assume a concave arcuate shape, with the center of the arc being at the center of the retaining pin of the arm.

There is one significant advantage of the preferred embodiment of the detent wheel arrangement illustrated in FIGS. 2–8 over the alternate embodiments described above. Specifically, when the preferred embodiment is folded into the closed or storage position, the cantilever springs 215 in the swivel bar 203 still engage the detents in the detent wheel 213. Consequently, when the preferred embodiment is unfolded into the open or operating position, the opening between the arms 233 will be at the same setting it was when the unit was collapsed into the closed position. This can be an advantage to the user who always uses the same size beverage container.

Operation

In the preferred embodiment of the invention, including the swivel bar/arm assembly 203–205 of FIGS. 3–8, the throat opening 233 between the arms is adjusted by simply pivoting one or both of the arms 204–205 either closer to or farther from the other arm, depending on the size of the beverage container. Preferably, before placing the beverage container in the receptacle 200, the user widens the opening 233 to a dimension well beyond that which is necessary to receive the beverage container. Then, the beverage container is placed in the receptacle 200 and, using a thumb and index finger, the arms are squeezed together until the appropriate opening 233 is achieved for that particular beverage container.

Figure 17:
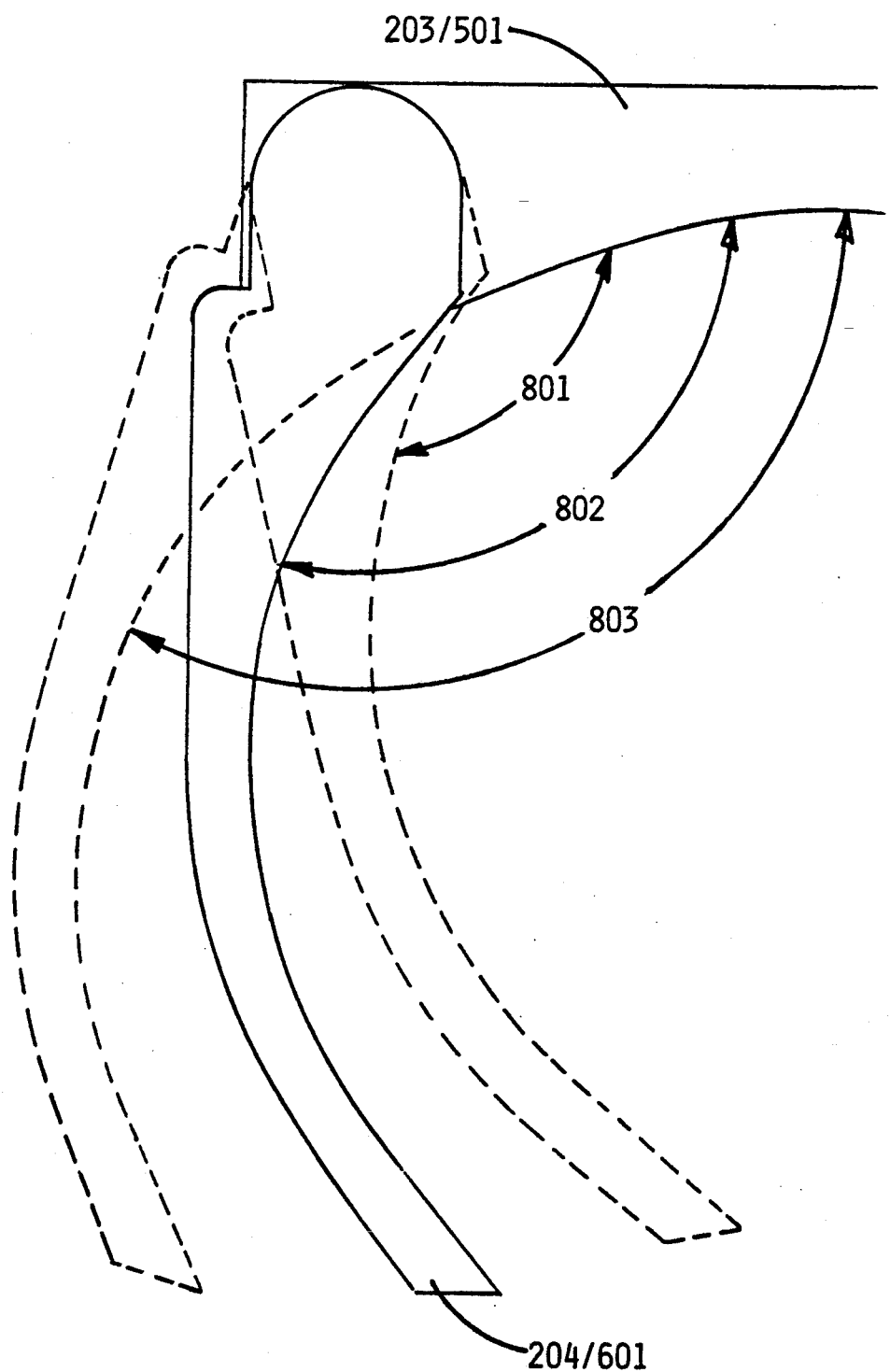
FIG. 17 is a top plan view of the arm and a portion of the swivel bar in which the arm is pictured in three different positions to illustrate the operation of the invention.

When an arm (e.g., arm 204) is pivoted to the "inside" position (the position closest to the other arm) the pawl 216 on the cantilever spring 215 engages the "outside" detent 213a on the detent wheel 213, thereby holding the arm at the inside position. As illustrated in FIG. 17, the arm makes a first angle 801 with the swivel bar 203 when the arm is held at the inside position. The cantilever spring and pawl exert sufficient force on the detent wheel such that a beverage container can be firmly held between the arms 204-205.

To change the position of the arm, the user exerts sufficient force on the arm to overcome the resistance of the spring 215 and pawl 216. This force causes the pawl to move from the outside detent 213a to the "middle" detent 213b as the arm moves to the middle position illustrated in solid lines in FIG. 17. In the middle position, the arm makes a second angle 802 with the swivel bar 203. Further force on the arm causes it to move to the "outside" position and the pawl to the inside detent 213c on the detent wheel 213. In the outside position, the arm makes a third angle 803 with the swivel bar, as illustrated in FIG. 17.

The collapsible beverage container receptacle 200 can be folded into a compact "storage" or "closed" position. In the "operating" or "open" position, the swivel bar/arm assembly 203-205 is positioned such that the arms 204-205 are perpendicular to the frame 202 and, similarly, the base 201 is positioned perpendicular to the frame. To collapse the receptacle, the user folds the swivel bar/arm assembly down until the arms are parallel to and adjacent the frame. Next, the base is folded up until it is also parallel to and adjacent the frame. When properly collapsed, the four side walls 221-224 of the base enclose the folded swivel bar/arm assembly. To open the receptacle, the user simply reverses the process and unfolds the base first, followed by the swivel bar/arm assembly. The base is provided with a notch 223a in its front side wall 223 so that, when the base is folded against the frame, the user can get a good grasp on the base by inserting a finger into the notch.

When the swivel bar/arm assembly 203-205 is in the open position wherein the arms 204-205 are perpendicular to the frame 202, the upper pair of cantilever springs 219 place moderate pressure on the rear surface 203b of the swivel bar 203, thereby holding the swivel bar/arm assembly in the open position. When the swivel bar/arm assembly is folded into the closed position wherein the arms are parallel to and adjacent the frame, the upper pair of cantilever springs holds the assembly in this position by placing moderate pressure on the lower surface 203c of the swivel bar. In between the open and closed positions, the upper pair of cantilever springs place additional (greater than "moderate") pressure on the swivel bar, thereby tending to force the swivel bar/arm assembly into one of two stable positions, i.e., open or closed.

Similar forces are exerted by the lower pair of cantilever springs 220 on the base 201. Specifically, in the open position in which the base is perpendicular to the frame 202, the lower pair of cantilever springs place moderate pressure on the rear surface 221a of the side 221 of the base, thereby holding the base in the open position. In the closed position in which the base is parallel to and adjacent the frame 202, the lower pair of cantilever springs 220 place moderate pressure on the upper edge of the side 221, thereby holding the base in the closed position. In between the open and closed positions, the lower pair of cantilever springs place additional (greater than "moderate") pressure on the side 221, thereby tending to force the base into one of two stable positions, i.e., open or closed.

In the alternate embodiment of the invention, which includes the swivel bar/arm assembly 501/601 illustrated in FIGS. 9-14, an alternate means for holding the arms in selectable angular positions is used. In this particular embodiment, the swivel bar/arm assembly 501/601 can be tilted to an additional "adjustment" position midway between the open and closed positions. In the adjustment position illustrated in FIG. 16, the arms (e.g., arm 601) form a 45 degree angle with the frame 202, and all adjustments of the throat opening 233 are made when the swivel bar/arm assembly is in the adjustment position. After adjustment, the swivel bar/arm assembly is rotated to the open position (perpendicular to the frame) wherein the arms are "locked" in place. The swivel bar/arm assembly is held in the adjustment position by the upper pair of cantilever springs 219, which place moderate pressure on the angled surface 501e of the swivel bar 501.

Figure 15:
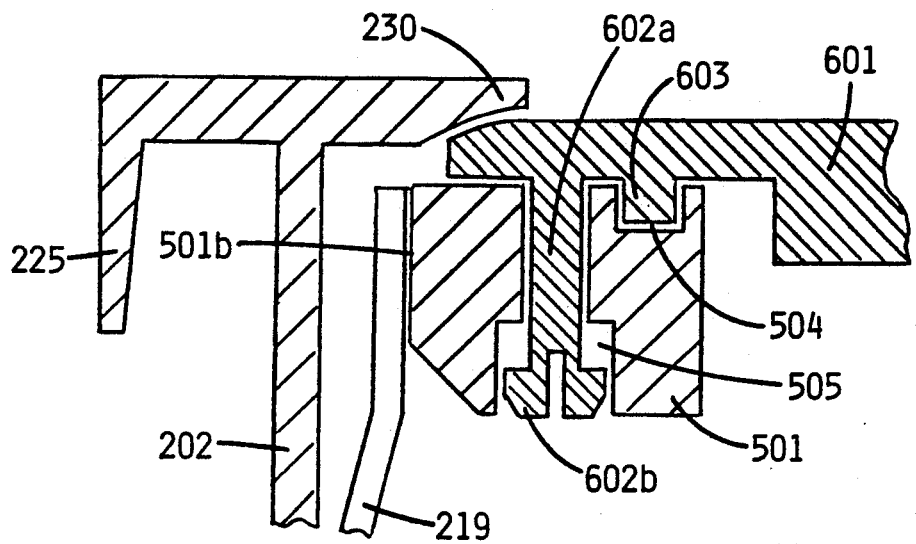
FIG. 15 is a cross sectional view of the present invention including the alternate embodiment of the arm and swivel bar assembly with the arm and swivel bar rotated into the "open" position in which the arm is parallel to the base.

The adjustment of the alternate embodiment of the invention is illustrated in FIGS. 15-16. In particular, FIG. 15 illustrates the invention with the swivel bar/arm assembly 501/601 in the open position in which the arms are locked in place and the receptacle is ready to receive a beverage container, and FIG. 16 illustrates the invention with the swivel bar/arm assembly in the adjustment position, wherein the arms can be moved from one angular position to another to adjust the opening 233 between the arms. Referring to these figures in conjunction with FIGS. 9-14, the insert 603 underneath the arm 601 is positioned in the inside hole 504a of the swivel bar 501 when the arm is in the inside position (again, the position closest to the other arm). To move the arm to the middle position, the swivel bar/arm assembly 501/601 is first tilted to the adjustment position. Next, the user lifts the arm 601 (in a direction parallel to the axis of the retaining pin, i.e., perpendicular to the upper surface 501a of the swivel bar) until the head portion 602b of the retaining pin strikes the lip 505a above the recess 505 in the swivel bar. When the arm is fully lifted, the insert 603 clears the upper surface 501a of the swivel bar to permit the arm to be pivoted to the middle position. Once the arm is in the middle position, the user lowers the arm such that the insert 603 drops into the middle hole 504b in the swivel bar. To lock the arm in position, the user simply rotates the swivel bar/arm assembly into the open position illustrated in FIG. 15. In the open position, the overhang 230 on the frame 202 prevents the arm from being lifted, thereby locking the arm in position. A similar procedure is followed to move the arm to the outside position, in which the insert is engaged in the outside hole 504c. This particular embodiment of the invention folds into a compact storage position in the same manner as the preferred embodiment described above.

I claim as my invention:

1. An adjustable beverage container receptacle, comprising in combination:
    a supporting structure;
    a swivel bar;
    first pivotal attaching means for pivotally attaching said swivel bar to said supporting structure;
    an arm;
    second pivotal attaching means for pivotally attaching said arm to said swivel bar such that said arm can rotate between first and second positions, wherein a first angle is formed between said arm and said swivel bar when said arm is in said first position, and a second angle is formed between said arm and said swivel bar when said arm is in said second position; and means for holding said arm in a selectable one of said first and second positions.

2. The adjustable beverage container receptable of claim 1, wherein said means for holding said arm includes:

first and second detents;

a pawl for engaging one of said detents; and spring means for forcing said pawl into one of said detents, such that said arm is held in said first position when said pawl is engaged in said first detent, said arm is held in said second position when said pawl is engaged in said second detent, and a predetermined force is required to overcome the force of said spring means to move said arm from said first to said second position.

3. The adjustable beverage container receptacle of claim 2, wherein said spring means is integrally formed with said swivel bar as a unitary structure.

4. The adjustable beverage container receptacle of claim 3, wherein said second pivotal attaching means for pivotally attaching said arm to said swivel bar includes a retaining pin having a stem portion and a head portion, and a hole for receiving said stem portion; said stem and head portions being integrally formed as a unitary structure, said stem portion being positioned in said hole and said head portion being wider than said hole such that said arm is attached to said swivel bar but free to pivot about said retaining pin.

5. The adjustable beverage container receptacle of claim 2, wherein said spring means includes a cantilever spring.

6. The adjustable beverage container receptacle of claim 5, wherein said second pivotal attaching means for pivotally attaching said arm to said swivel bar includes a retaining pin having a stem portion and a head portion, and a hole for receiving said stem portion; said stem and head portions being integrally formed as a unitary structure, said stem portion being positioned in said hole and said head portion being wider than said hole such that said arm is attached to said swivel bar but free to pivot about said retaining pin.

7. The adjustable beverage container receptacle of claim 5, wherein said cantilever spring is integrally formed with said swivel bar as a unitary structure.

8. The adjustable beverage container receptacle of claim 7, wherein said second pivotal attaching means for pivotally attaching said arm to said swivel bar includes a retaining pin having a stem portion and a head portion, and a hole for receiving said stem portion; said stem and head portions being integrally formed as a unitary structure, said stem portion being positioned in said hole and said head portion being wider than said hole such that said arm is attached to said swivel bar but free to pivot about said retaining pin.

9. The adjustable beverage container receptacle of claim 2, wherein said second pivotal attaching means for pivotally attaching said arm to said swivel bar includes a retaining pin having a stem portion and a head portion, and a hole for receiving said stem portion; said stem and head portions being integrally formed as a unitary structure, said stem portion being positioned in said hole and said head portion being wider than said hole such that said arm is attached to said swivel bar but free to pivot about said retaining pin.

10. The adjustable beverage container receptacle of claim 1, wherein said means for holding said arm includes:

an insert; and first and second holes for receiving said insert, said arm being held in said first position when said insert is in said first hole, and said arm being held in said second position when said insert is in said second hole.

11. The adjustable beverage container receptacle of claim 10, wherein said second pivotal attaching means for pivotally attaching said arm to said swivel bar includes a retaining pin having a stem portion and a head portion, and a hole for receiving said stem portion; said stem portion being positioned in said hole and said head portion being wider than said hole such that said arm is attached to said swivel bar but free to pivot about said retaining pin, the length of said stem portion being longer than the depth of said hole such that said arm can be lifted a predetermined distance to withdraw said insert from said holes.

12. The adjustable beverage container receptacle of claim 1, wherein said second pivotal attaching means for pivotally attaching said arm to said swivel bar includes a retaining pin having a stem portion and a head portion, and a hole for receiving said stem portion; said stem portion being positioned in said hole and said head portion being wider than said hole such that said arm is attached to said swivel bar but free to pivot about said retaining pin, the length of said stem portion being longer than the depth of said hole such that said arm can be lifted a predetermined distance to withdraw said insert from said holes.

13. An adjustable beverage container receptacle, comprising in combination:

a swivel bar including two hinge pins and a retaining pin hole, said swivel bar and hinge pins being integrally formed as a unitary structure;

a supporting structure having two hinge pin holes, each of said hinge pins being engaged in one of said hinge pin holes;

an arm including a retaining pin having a stem portion and a head portion, said arm and retaining pin being integrally formed as a unitary structure, said stem portion being positioned in said retaining pin hole, said head portion being wider than said retaining pin hole such that said arm is attached to said swivel bar but free to rotate about said retaining pin between first and second positions; and means for holding said arm in a selectable one of said first and second positions.

14. The adjustable beverage container receptacle of claim 13, wherein:

said arm includes a detent wheel having first and second detents, said arm and detent wheel being integrally formed as a unitary structure; and said swivel bar includes a spring and pawl, said swivel bar, spring and pawl being integrally formed as a unitary structure, said spring forcing said pawl into said first detent when said arm is in said first position, said spring forcing said pawl into said second detent when said arm is in said second position, and a predetermined force is required to overcome the force of said spring to move said arm from said first position to said second position.

15. The adjustable beverage container receptacle of claim 13, wherein:
said arm includes an insert; and
said swivel bar includes first and second insert holes for receiving said insert, said arm being held in said first position when said insert is in said first insert hole, and said arm being held in said second position when said insert is in said second insert hole.

16. The adjustable beverage container receptacle of claim 15, wherein the length of said stem portion of said retaining pin is longer than the depth of said retaining pin hole, such that said arm can be lifted a predetermined distance to withdraw said insert from said insert holes.

* * * * *